June 17, 1969   J. W. REILLY ET AL   3,450,784
HYDROGENATION OF BENZENE TO CYCLOHEXANE
Filed Sept. 22, 1966
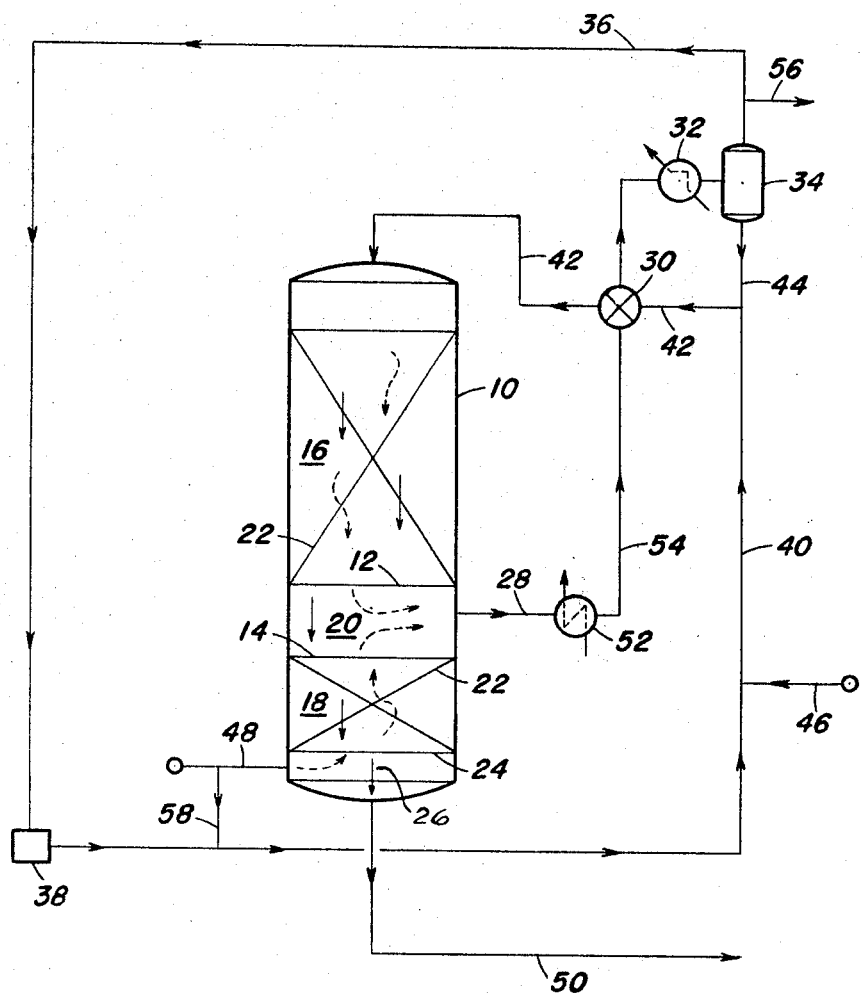
INVENTORS
James W. Reilly
Morgan C. Sze
BY
ATTORNEY

United States Patent Office 3,450,784
Patented June 17, 1969

3,450,784
HYDROGENATION OF BENZENE TO CYCLOHEXANE
James W. Reilly, Westfield, N.J., and Morgan C. Sze, Garden City, N.Y., assignors to The Lummus Company, Bloomfield, N.J., a corporation of Delaware
Filed Sept. 22, 1966, Ser. No. 581,238
Int. Cl. C07c 5/10, 13/18
U.S. Cl. 260—667                                    7 Claims

ABSTRACT OF THE DISCLOSURE

A process for the hydrogenation of hydrocarbons, particularly for the production of cyclohexane from benzene, in which the temperature profile of the reaction is controlled so as to maximize benzene conversion and cyclohexane yields. The feed is passed cocurrently with hydrogen into a first reaction zone, gaseous products are drawn off, and the liquid effluent is passed into a second reaction zone, where it is contacted counter-currently by cold hydrogen. Vapors from this second zone can be combined with vapors from the first zone, cooled and condensed to provide a liquid stream which can be used as recycle if desired and mixed with the feed, and a gaseous hydrogen-containing stream. Liquid product in the second reaction zone is drawn off as 99.9 plus percent pure cyclohexane.

---

This invention relates to the preparation of cyclohexane. In particular, this invention relates to an improved process and apparatus for the preparation of cyclohexane by the catalytic hydrogenation of benzene.

Present industrial processes for the production of high purity cyclohexane through the catalytic hydrogenation of benzene differ principally in their methods for the removal of the high exothermic heat of reaction. One method employs indirect water cooling in a jacketed reactor; another uses a vaporization of feed and recycle product in a vapor phase, multi-reactor process with intercooling between reactors. Both employ cocurrent flow in vapor or mixed phase. Still another process uses a catalyst slurry with a liquid pump-around for indirect cooling.

In order to have extreme high purity cyclohexane product (99.9% or higher) a second reactor is generally thought advisable. However, all the above processes show a rising temperature profile from a reactor inlet to reactor outlet, which high outlet temperature does not favor maximum benzene conversion or cyclohexane yield in the benzene-cyclohexane equilibrium.

It has also been proposed to hydrogenate benzene to cyclohexane in a vertical catalytic reactor, in countercurrent fashion, by introducing benzene into the top of the reactor, and hydrogen into the bottom. In such a process, the temperature profile descends in the direction of liquid flow, being higher near the top of the reactor by reason of the high exothermic reaction heat generated in the benzene-rich reaction mixture, and lower near the bottom of the reactor because of the relatively small amount of benzene available and consequently small exothermic heat produced in the lower regions, and also because of the cooling effect of the hydrogen feed into the bottom of the reactor.

Such a temperature gradient has been recognized as desirable, in that the higher temperatures in the upper part of the reactor favor rapid reaction rates, and consequently more efficient and economical use of the equipment, while the lower temperatures near the bottom of the reactor favor the equilibrium in such a way as to ensure a high percentage conversion of benzene to cyclohexane.

The inherent production of a falling temperature profile in the type of process just described, while desirable, is largely uncontrolled, except insofar as it can be controlled by varying the rate of introduction of benzene. For example, if the benzene feed rate is adjusted to maintain the temperature in the upper part of the reactor at an optimum value from the standpoint of reaction rate, the resulting temperature in the lower region of the reactor may be either too high, resulting in an unfavorable equilibrium, or too low, so that the reaction rate is slowed down and the liquid effluent drawn off from the bottom of the reactor has not had time to react completely. In either case, the conversion of benzene to cyclohexane is incomplete, and the liquid effluent must be purified, for example by extractive distillation, to remove substantial amounts of benzene. For this reason, it has generally been found necessary to provide temperature control means such as coils or the like, to heat or cool various regions in the reaction chamber as needed to produce the optimum temperatures in the various parts of the reaction chamber. The incorporation of such heating and cooling coils complicates the construction of the apparatus, rendering it more expensive to fabricate. Moreover, the use of external heating and cooling media, such as steam, cooling water and the like, while not prohibitively expensive, does add somewhat to the cost of the product.

An object of this invention, therefore, is to provide an improved process for the hydrogenation of benzene to high purity cyclohexane.

Another object is to provide a process characterized by exceptionally high utilization of hydrogen.

Yet another object of the invention is to provide a process for the removal of the exothermic heat of the hydrogenation reaction and the regulation of the temperature profiles of the reaction zones to maximize the yield of the principal product, cyclohexane, and to minimize harmful side reactions. Still another object of the invention is to provide for a high partial pressure of hydrogen at the final stage of reaction for the completion of the conversion of benzene to cyclohexane at temperature levels low enough to favor the yield of cyclohexane over benzene and still high enough to insure a respectable reaction rate.

A feature of the invention is the control of temperature in the reaction zones by removal of exothermic heat of reaction through the sensible heating of the feed streams.

Another feature is the control of temperature in the reaction zones by vaporizing liquid product hydrocarbons in the reaction zone.

Still another feature is the control of temperature by the vaporization of the feed benzene in the reaction zone.

Another feature is the use of a plurality of reaction zones, including an initial reaction zone in which the major portion of the benzene is cocurrently hydrogenated to cyclohexane and a finishing zone in which the residual benzene in the reaction mixture is hydrogenated under countercurrent flow conditions.

According to another feature of the invention, the temperature in the finishing zone is controlled by using cool fresh-feed hydrogen.

Another feature resides in the step of drawing off vaporized hydrocarbons from between the initial stage and the finishing stage, condensing and cooling such vaporized hydrocarbons, and returning them as liquid recycle to the initial stage.

Other objects, features and advantages of the invention will become apparent from the following more complete description and claims, and the accompanying drawing.

In one particularly desirable embodiment, this invention contemplates a process for hydrogenating a feed liquid, comprising in combination the steps of passing a hydrogen rich gas cocurrently with said feed liquid through an initial reaction zone in contact with a hydrogenation catalyst, drawing off some from said initial reaction zone a gas-phase effluent comprising hydrogen, inert, and vaporized liquid materials and a liquid-phase effluent comprising a mixture of said feed liquid and hydrogenated products thereof, passing said liquid-phase effluent into a second reaction zone, passing a hydrogen rich gas into said second reaction zone countercurrently to said liquid-phase effluent from said first zone in contact with a hydrogenation catalyst, and drawing off from said second reaction zone a gas-phase effluent comprising hydrogen, inert, and vaporized liquid materials and a liquid-phase effluent consisting essentially of fully-hydrogenated products of said feed liquid.

In another particularly desirable embodiment, this invention contemplates an apparatus for carrying out chemical processes, said apparatus comprising in combination a generally vertical vessel internally partitioned by means of geenrally horizontal partitions to define an upper reaction chamber, a lower reaction chamber and a vapor-disengaging zone intermediate said reaction chambers, conduit means for drawing off gas-phase effluent passing into said vapor-disengaging zone from said first and second reaction chambers, said conduit means communicating with separator means for separating permanent gases in said gas-phase effluent from vaporized liquids therein, means for drawing off a gas-phase effluent and a liquid-phase effluent from said separator means, conduit means for returning liquid-phase effluent from said separator means to at least one of said reaction chambers, and means for returning gas-phase effluent from said separator means to at least one of said reaction chambers.

The process and apparatus of this invention are particularly adapted to the hydrogenation of benzene to cyclohexane as above indicated, and will be described particularly with reference to such a process. Nevertheless, as will be apparent to those skilled in the art both the process and the apparatus are useful in connection with many other chemical processing operations, particularly with exothermic hydrogenation reactions, as well as various other reactions of gases with liquids.

Referring now to the drawing, the single figure is a diagrammatic illustration of both the process and the apparatus of the invention, as utilized in the hydrogenation of benzene to cyclohexane.

As shown in the drawing, the apparatus of the invention comprises a converter 10 which is a vessel in the form of a vertical cylinder having dished ends and pressure-sustaining walls. The interior of the vessel is divided by horizontal partitions 12 and 14, which are preferably foraminous plates or the like, into a plurality of chambers including an upper reaction chamber 16, a lower reaction chamber 18 and an intermediate vapor-disengaging zone 20. Reaction chambers 16 and 18 are packed with a suitable hydrogenation catalyst 22, which may be any of the well-known hydrogenation-dehydrogenation catalysts, including such as Raney nickel, or nickel, platinum or palladium, preferably on a support such as alumina, silica, kieselguhr, diatomaceous earth, magnesia, zirconia, or other inorganic oxides, alone or in combination.

The catalyst in chamber 16 is supported on partition 12, and that in reaction chamber 18 on a similar horizontal partition 24, also preferably in the form of a foraminous plate or the like. Partition 24 is preferably spaced somewhat above the bottom of the converter, thus defining the upper boundary of an additional chamber 26 which in operation serves as a "wind-chest" filled with hydrogen rich gas, which is then distributed by partition 24 and passes up countercurrently through the liquid reaction mixture in chamber 18.

Means in the form of conduit 28 are provided for withdrawing vapor from vapor-disengaging chamber 20 and passing it, preferably by way of heat-exchanger 30 and condenser 32, to a separator 34.

Separator 34, in turn, is provided with means in the form of conduit 36 for drawing off a gas-phase effluent, and returning it, preferably by way of compressor 38 and lines 40 and 42, to one of the reaction chambers, in this case upper reaction chamber 16. Separator 34 is also provided with means in the form of conduit 44 for withdrawing a liquid-phase effluent and returning it, via line 42, to upper reaction chamber 16.

In the operation of the apparatus as shown in the drawing for the hydrogenation of benzene to cyclohexane, fresh feed benzene is introduced through line 46 into a hydrogen stream in line 40, and the mixture proceeds in line 40 in the direction indicated by the arrows until it joins line 44, at which point condensed recycle liquid from separator 34 is added to the mixture in line 40. The resulting mixture then passes via line 42 through heat exchanger 30 into the top of the converter.

As the mixture of hydrogen rich gas, benzene and recycle hydrocarbons passes downwardly through reaction chamber 16, the benzene is largely converted to cyclohexane, and any benzene or partially hydrogenated benzene in the recycled liquid portion of the mixture is likewise largely converted to cyclohexane.

The reaction mixture passing downwardly through partition 12 from reaction chamber 16 into vapor-disengaging zone 20 is a two-phase mixture in which the liquid phase is a mixture of benzene, cyclohexane, and partially hydrogenated products of benzene such as cyclohexene and cyclohexadiene. The vapor phase effluent from reaction chamber 16 is a mixture of hydrogen, inert gaseous impurities, and vaporized liquid hydrocarbons of a composition generally similar to that of the liquid-phase effluent fraction.

The liquid phase portion of the effluent from upper reaction chamber 16 passes directly down through partition 14, which serves as a distributor plate, into reaction chamber 18.

In reaction chamber 18, the liquid portion is contacted countercurrently with hydrogen fed in through line 48 into chamber 26 and thence upwardly through partition 24 and through reaction chamber 18. During this countercurrent contacting of the liquid mixture of benzene, cyclohexane, etc. With hydrogen, the small amount of the remaining benzene and partially-hydrogenated components is hydrogenated substantially quantitatively to cyclohexane and the liquid passing downwardly through partition 24 into the dished bottom of the converter, which is drawn off therefrom through line 50, is substantially pure cyclohexane. With proper control of the temperatures and recirculation rates, it is possible to draw off a liquid product through line 50, which consistently assays 99.9% or higher cyclohexane with a benzene content of less than 100 p.p.m.

The gas-phase effluent from both the first reaction chamber 16 and the second reaction chamber 18 collects in vapor-disengaging zone 20. This gas-phase fraction consists mainly of inerts and excess hydrogen, together with benzene, cyclohexane, and partially-hydrogenated derivatives of benzene. This combined gas-phase fraction is withdrawn through line 28 and passed, preferably, through a heat-exchanger, or waste-heat boiler 52, wherein a portion of the sensible heat of the gaseous mixture is extracted to produce steam for use in other processing steps, or in other processes, or for general purposes such as production of hot water, steam for heating working areas, etc.

Upon emerging from the waste-heat boiler 52, the still-hot vapor mixture proceeds through line 54 to heat exchanger 30 where it preheats the feed mixture in line 42 to a desired feed temperature, losing some of its own sensible heat, and possibly partially condensing (depending on operating conditions).

The cooled, and possibly partially condensed gas phase reactor effluent is then preferably passed through condenser 32, where the vaporized liquid phase components remaining in the mixture are recondensed to liquids. The resulting two-phase system, consisting of gaseous hydrogen, inert, and reliquefied hydrocarbons, is passed into separator 34, where the gaseous phase is separated from the liquid phase. The liquid phase is passed through line 44 to be mixed with the feed benzene and hydrogen rich gas in line 40, as previously described. The gas phase effluent from separator 34 may be vented partially, as through vent line 56, in order to prevent build-up of inert impurities in the system. The remainder of the gas phase effluent from the separator is recycled through line 36, as previously described.

Fresh feed hydrogen rich gas is supplied to chamber 26, and thence to reaction chamber 18, through line 48. In case the recycled hydrogen in line 36 is insufficient to supply the needs of the first reaction stage taking place in reaction chamber 16, a portion of the fresh feed hydrogen rich gas in line 48 may be diverted through line 58 and added to the recycled hydrogen gas.

As the hydrogen feed from line 48 passes upwardly through reaction chamber 18, a portion of the heat present in that chamber is absorbed in the process of sensibly heating the hydrogen, and an additional quantity of heat is absorbed by the vaporization of reaction-product liquid in chamber 18, in amount sufficient to saturate the gas stream emerging from chamber 18 into vapor-disengagement zone 20. The liquid so vaporized is carried with the gas stream through waste-heat boiler 52 and heat exchanger 30 until it is condensed in condenser 32 and separated in separator 34, as previously described.

In a generalized example of the operation of the process and apparatus of this invention to produce cyclohexane by the catalytic hydrogenation of benzene, a mixture of benzene, recycled cyclohexane and hydrogen gas is preheated in heat exchanger 30 and passed into the top of the converter, and into reaction chamber 16, at a temperature of from 150 to 500° F., and a pressure between about 200 and about 800 p.s.i. If desired, the recycled liquid, benzene and hydrogen may be separately preheated in separate heat exchangers and then mixed either prior to being introduced into the reaction zone, or in the reaction zone itself. The mixture is passed cocurrently downward through reaction chamber 16 in contact with a suitable hydrogenation catalyst under adiabatic reaction conditions. The liquid-phase effluent from reaction zone 16 is passed directly through the vapor disengagement zone 20 into reaction zone 18, as above described, while the gas-phase effluent (together with the gas-phase effluent from reaction zone 18) passes out of vapor-disengagement zone 20 by way of conduit 28, as also previously described. The liquid-phase effluent from reaction chamber 16, as it is passed into reaction chamber 18, is approximately 99% cyclohexane, the remainder being benzene, partially hydrogenated products of benzene, and incidental impurities.

In reaction chamber 18, the above-described liquid effluent from chamber 16 is contacted counter-currently with hydrogen introduced through line 48, at a temperature between about 100 and about 375° F., under the same pressure as obtains in reaction chamber 16. The liquid phase effluent discharged from reaction chamber 18 through line 50 is high purity cyclohexane, normally containing less than 100 p.p.m. benzene and other impurities, if any, in even smaller amounts. The cyclohexane product is preferably then stabilized according to conventional methods which form no part of the present invention and accordingly are not described in detail.

The ratio of hydrogen to benzene in the mixture fed to reaction chamber 16 may vary from a stoichiometric 3:1 mol ratio to as much as about 15:1, and the ratio of hydrogen to the benzene in the hydrocarbons fed into reaction chamber 18 may vary from about 9:1 to about 100:1 mols/mol).

The molar ratio of recycled hydrocarbons to fresh-feed benzene in line 42 may vary from 0.5:1 to as much as 10:1, depending on the choice of operation conditions, particularly reactor temperature and pressure, but preferably is maintained between about 3:1 and 10:1.

The L.H.S.V. in the upper section is preferably maintained between about 0.50 and 5.00, based on fresh feed benzene, and the inlet temperature (gas and liquid) between about 150 and 500° F. The pressure is preferably maintained between 200 and 800 p.s.i.g.

The temperature of the gas feed to the bottom reactor section is preferably between about 85 and 250° F., and the conditions within the reactor, particularly in the bottom section, should be adjusted to maintain the temperature of the liquid product at the outlet between about 250 and 310° F., to provide optimum equilibrium conditions favoring complete conversion to cyclohexane.

In order to illustrate more fully the nature of this invention and the manner of practicing the same, the following more specific examples are presented.

Example 1

In an apparatus of the type shown in the drawing, a liquid feed benzene and a liquid recycle mixture, containing a total of 18.5% benzene by weight, was fed into the top of the upper reactor section through line 42, at a rate of 2.06 ft.$^3$/hr./ft.$^3$ (L.H.S.V.) together with hydrogen-rich gas in amount to provide a hydrogen benzene mole ratio of 4.9:1. The temperature of the liquid feed was 242° F. and that of the gas feed was 234° F., and the pressure in the upper reactor section and in line 42 was 600 p.s.i.g. The maximum temperature in the upper reactor section was 412° F. and the temperature at the bottom outlet thereof, communicating with vapor-disengaging zone 20, was 406° F.

After disengagement of the vapor phase, which was taken off in line 28 as described above, the liquid remaining entered the lower reactor section at a temperature of 360° F. In the lower reactor section, the liquid was contacted countercurrently with a hydrogen-rich feed gas introduced via line 48 at a rate of 7.5 s.c.f.h., and at a temperature of 98° F.

A liquid product consisting essentially of pure cyclohexane was drawn off through line 50 at a temperature of 292° F.

Example 2

A liquid feed mixture comprising fresh feed benzene and recycled liquid, and containing 16.0% by weight of benzene, was fed into the top of the upper reactor section of an apparatus of the type shown in the drawing, at a rate of 1.05 ft.$^3$/hr./ft.$^3$ (L.H.S.V.), together with hydrogen-rich gas in amount to provide a hydrogen:benzene mole ratio of 12.07. The temperature of the liquid feed was 238° F., and that of the gas feed was 242° F. (both measured as inlet temperatures, before mixing). The pressure in the upper reactor section and in feed line 42 was maintained at 750 p.s.i.g., and the maximum temperature attained in the upper reactor section was 351° F. The temperature measured at the bottom outlet of the upper reaction section was 345° F.

The liquid effluent from the upper section, after being separated from excess hydrogen gas and vapor-phase products, entered the lower section at 302° F. and was contacted counter-currently therein with hydrogen-rich gas fed into the bottom of the lower section at 103° F. The final liquid product left the reactor through line 50 at a temperature of 282° F., and was found on analysis to be substantially pure cyclohexane, having a benzene content of less than 16 p.p.m.

Example 3

In an apparatus of the type shown in the drawing, a liquid feed mixture containing 16.0 wt. percent of benzene was fed to the top section of the reactor at 260° F., where it was mixed with hydrogen-rich gas at 248° F. The L.H.S.V. feed rate of the liquid feed was 1.53 ft.³/hr./ft.³ benzene, and the mol ratio of hydrogen to benzene in the mixed feed was 6.16:1. The pressure in the reactor was maintained at 650 p.s.i.g.

The maximum temperature observed in the top section was 400° F., and the temperature at the outlet thereof was 395° F.

The remaining liquid was separated in the vapor-disengaging zone 20 from excess hydrogen gas, inerts, and vaporized liquid reaction products, and entered the lower section at 352° F.

In the lower section, the liquid was contacted countercurrently with a hydrogen-rich gas which was fed into the bottom of the reactor at 107° F., at a rate of 7.7 s.c.f.h.

The net product was drawn off via line 50 at a temperature of 308° F.

The purity of the product as determined by ultra-violet analysis indicated a benzene level of less than 16 p.p.m.

The process and apparatus of the present invention provide an improved system for the carrying out of chemical reactions, in particular exothermic hydrogenation reactions, and most especially the catalytic hydrogenation of benzene to cyclohexane. The present invention compares favorably with existing processes in the matter of recovery of exothermic reaction heat by generation of steam, and offers the further advantages of lower capital costs, lower operating costs, lower residual benzene in the product cyclohexane, and more stable control of reaction zone temperatures than are available using processes heretofore proposed.

While this invention has been described with reference to certain preferred embodiments and illustrated by way of certain examples and drawings, these are illustrative only, as many alternatives and equivalents will readily occur to those skilled in the art, without departing from the spirit or proper scope of the invention. The invention is therefore not to be construed as limited, except as set forth in the appended claims.

We claim:

1. A process for hydrogenating benzene comprising in combination the steps of
    preheating the benzene,
    hydrogenating the benzene by passing it concurrently with preheated hydrogen through a first reaction zone operated at a temperature of from about 150° F. to about 500° F. and a pressure between about 200 and about 800 p.s.i. in contact with a hydrogenation catalyst,
    drawing off from said first said reaction zone a gas-phase effluent comprising hydrogen and vaporized liquid materials, and a liquid-phase effluent comprising a mixture of benzene and hydrogenated products thereof,
    passing said liquid phase effluent into a second reaction zone operated at a temperature of from about 100° F. to about 375° F. and a pressure between about 200 and about 800 p.s.i.,
    hydrogenating said liquid-phase effluent by passing hydrogen into said second reaction zone countercurrently to it, in contact with a hydrogenation catalyst, and
    drawing off from said second reaction zone a gas-phase effluent comprising hydrogen and vaporized liquid materials and a liquid-phase effluent consisting essentially of cyclohexane.

2. A process according to claim 1, wherein said gas-phase effluent from said initial reaction zone and the gas-phase effluent from said second reaction zone are passed through a heat exchanger and partially cooled, while generating steam in said heat exchanger.

3. A process according to claim 1, wherein said gas-phase effluent from said first reaction zone and said gas-phase effluent from said second reaction zone are combined and passed in indirect heat-exchange relationship with the feed to said first reaction zone, thereby cooling said gas-phase effluents and preheating said feed.

4. A process according to claim 1, wherein said gas-phase effluents from said first and second reaction zones are cooled sufficiently to condense the vaporized liquid components thereof, and said liquid components are separated from the permanent-gas components and returned as liquid feed to said first reaction zone.

5. A process according to claim 4, wherein at least a major portion of said permanent-gas components is returned as gas feed to said first stage.

6. A process according to claim 4, wherein the ratio of the said liquid components returned as liquid feed to said first reaction zone, to fresh feed benzene, is from 0.5:1 to 10:1.

7. A process according to claim 6, wherein the said ratio is from 3:1 to 10:1.

References Cited

UNITED STATES PATENTS

| | | | |
|---|---|---|---|
| 3,147,210 | 9/1964 | Hess et al. | 208—210 |
| 2,373,501 | 4/1945 | Peterson | 260—667 |
| 2,671,754 | 3/1954 | De Rosset et al. | 208—89 |
| 3,253,047 | 5/1966 | Bellinger | 260—667 |
| 3,070,640 | 12/1962 | Pfeiffer et al. | 260—667 |
| 3,175,015 | 3/1965 | Johnson | 260—667 |
| 3,227,768 | 1/1966 | Cole | 260—667 |

DELBERT E. GANTZ, *Primary Examiner.*

V. O'KEEFE, *Assistant Examiner.*